(12) United States Patent
Sturza et al.

(10) Patent No.: US 10,632,856 B2
(45) Date of Patent: Apr. 28, 2020

(54) CONNECTOR-INTEGRATED ENDPLATE FOR BATTERY ELECTRIC VEHICLES

(71) Applicant: Ford Global Technologies, LLC, Dearborn, MI (US)

(72) Inventors: John Sturza, Royal Oak, MI (US); Neil Robert Burrows, White Lake Township, MI (US); Sai K. Perumalla, Rochester Hills, MI (US); Rohit Gunna, Novi, MI (US); Hyung Min Baek, Fremont, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 438 days.

(21) Appl. No.: 15/409,620

(22) Filed: Jan. 19, 2017

(65) Prior Publication Data
US 2018/0201153 A1    Jul. 19, 2018

(51) Int. Cl.
| | |
|---|---|
| *B60L 11/18* | (2006.01) |
| *B60L 50/60* | (2019.01) |
| *H01M 2/30* | (2006.01) |
| *H01M 2/20* | (2006.01) |
| *H01M 2/10* | (2006.01) |
| *H01R 13/53* | (2006.01) |
| *H01R 25/16* | (2006.01) |

(52) U.S. Cl.
CPC ............ *B60L 11/1877* (2013.01); *B60L 50/66* (2019.02); *H01M 2/1077* (2013.01); *H01M 2/20* (2013.01); *H01M 2/30* (2013.01); *H01R 13/53* (2013.01); *H01R 25/162* (2013.01); *H01M 2/206* (2013.01); *H01M 2220/20* (2013.01); *Y02T 10/705* (2013.01); *Y02T 10/7005* (2013.01); *Y10S 903/907* (2013.01)

(58) Field of Classification Search
CPC ............. H01M 2220/20; H01M 2/1077; Y10S 903/907; Y02T 10/7005; H01R 13/53; B60L 50/66
See application file for complete search history.

(56) References Cited

U.S. PATENT DOCUMENTS

| | | | |
|---|---|---|---|
| 4,528,255 A | 7/1985 | Hayes et al. | |
| 6,330,144 B1 * | 12/2001 | Lee | H01R 13/652 361/115 |
| 8,968,912 B2 | 3/2015 | Maguire et al. | |
| 9,067,486 B2 | 6/2015 | Janarthanam et al. | |
| 9,166,215 B2 | 10/2015 | Utley et al. | |
| 9,321,337 B2 | 4/2016 | Wang et al. | |
| 9,356,325 B1 | 5/2016 | Poirier | |
| 9,362,535 B2 | 6/2016 | Utley et al. | |
| 9,440,555 B2 | 9/2016 | Garfinkel et al. | |
| 9,478,779 B2 | 10/2016 | Burkman | |

(Continued)

*Primary Examiner* — Jared Fureman
*Assistant Examiner* — Emmanuel Dominique
(74) *Attorney, Agent, or Firm* — David Kelley; Brooks Kushman P.C.

(57) ABSTRACT

An integrated endplate for a battery pack includes an inner wall and an outer wall. The outer wall has a first side adjacent to the inner wall and a second side opposite the first side. The outer wall includes a connector interface protruding from the second side and defining at least one aperture therethrough. The integrated endplate further includes at least one electrical connector extending between the inner wall and the outer wall to the at least one aperture of the connector interface.

9 Claims, 3 Drawing Sheets

(56) References Cited

U.S. PATENT DOCUMENTS

| | | |
|---|---|---|
| 2004/0235333 A1* | 11/2004 | Schaich ............... H01R 13/642 439/374 |
| 2005/0075768 A1* | 4/2005 | Nicholson ............... G06F 1/263 701/31.4 |
| 2012/0003868 A1* | 1/2012 | Daugherty ......... H01R 13/6315 439/540.1 |
| 2012/0175177 A1 | 7/2012 | Lee et al. |
| 2012/0244398 A1* | 9/2012 | Youngs ................. B60L 3/0046 429/61 |
| 2012/0263988 A1* | 10/2012 | Obasih ............... H01M 10/625 429/98 |
| 2012/0302081 A1* | 11/2012 | Daugherty ......... H01R 13/6315 439/248 |
| 2012/0321934 A1 | 12/2012 | Hopkins et al. |
| 2015/0064541 A1 | 3/2015 | Noh et al. |
| 2015/0217707 A1* | 8/2015 | Tanigaki .................. B60K 1/04 180/65.1 |
| 2015/0229071 A1* | 8/2015 | Degen .................. H01R 13/627 439/712 |
| 2015/0280184 A1 | 10/2015 | Utley et al. |
| 2015/0333383 A1 | 11/2015 | Janarthanam et al. |
| 2016/0064709 A1 | 3/2016 | Miller et al. |
| 2016/0141569 A1 | 5/2016 | Mascianica et al. |
| 2016/0204400 A1 | 7/2016 | Baek et al. |

\* cited by examiner

CONNECTOR-INTEGRATED ENDPLATE FOR BATTERY ELECTRIC VEHICLES

TECHNICAL FIELD

This disclosure relates to a battery system, and more particularly, to a battery system having an endplate integrated with electrical connectors.

BACKGROUND

Electrified vehicles, such as hybrid electric vehicles (HEVs), plug-in hybrid electric vehicles (PHEVs), battery electric vehicles (BEVs), or fuel cell vehicles differ from conventional motor vehicles in that they are powered by electric machines (i.e., electric motors and/or generators) instead of or in addition to an internal combustion engine. High voltage (HV) current for powering these types of electric machines is typically supplied by a high voltage traction battery system.

Electrified vehicle battery systems may employ one or more battery modules that include a plurality of battery arrays. Each battery array includes a plurality of battery cells that are supported relative to one another and are interconnected electrically between battery cell terminals and interconnector bus bars. The packaging of these battery arrays may benefit from structural energy management to maintain the integrity of the battery cells.

In order to maximize the vehicle's effective driving range, it is desirable to increase the number of battery cells the vehicle carries. The battery cells are typically separated into modules and installed in a location within the vehicle. Existing storage locations for batteries include the fuel tank zone, tunnel area (or underbody), underneath the seats, or in the trunk area. In addition, the packaging of battery modules can require particular attention with respect to impact energy management and mitigation.

Existing vehicle battery systems include connections modules to connect battery modules to various controllers. Such connection modules typically increase the size of the battery system.

SUMMARY

An electrified vehicle includes an electric machine and a bussed electrical center electrically connected to the electric machine. The electrified vehicle further includes a battery pack electrically connected to the bussed electrical center. The battery pack includes a battery cell array and a frame for supporting the battery cell array. The frame includes opposing side components and opposing endplates. At least one opposing endplate is an integrated endplate having an inner wall disposed adjacent to the battery cell array. The endplate also includes an outer wall having a first side adjacent to the inner wall and a second side opposite the first side. The outer wall includes a connector interface protruding from the second side and defining at least one aperture therethrough. The endplate also includes at least one electrical connector extending between the inner wall and the outer wall to the at least one aperture of the connector interface.

In another approach, an integrated endplate for a battery pack includes an inner wall and an outer wall. The outer wall has a first side adjacent to the inner wall and a second side opposite the first side. The outer wall includes a connector interface protruding from the second side and defining at least one aperture therethrough. The integrated endplate further includes at least one electrical connector extending between the inner wall and the outer wall to the at least one aperture of the connector interface.

In still another approach, a vehicle battery pack includes a frame for supporting a battery cell array. The frame includes opposing side components and opposing endplates. At least one opposing endplate includes an inner wall and an outer wall secured to the inner wall and having a protruding connector interface defining at least one aperture therethrough. The at least one endplate further includes at least one electrical connector extending between the inner wall and outer wall to the at least one aperture of the connector interface

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
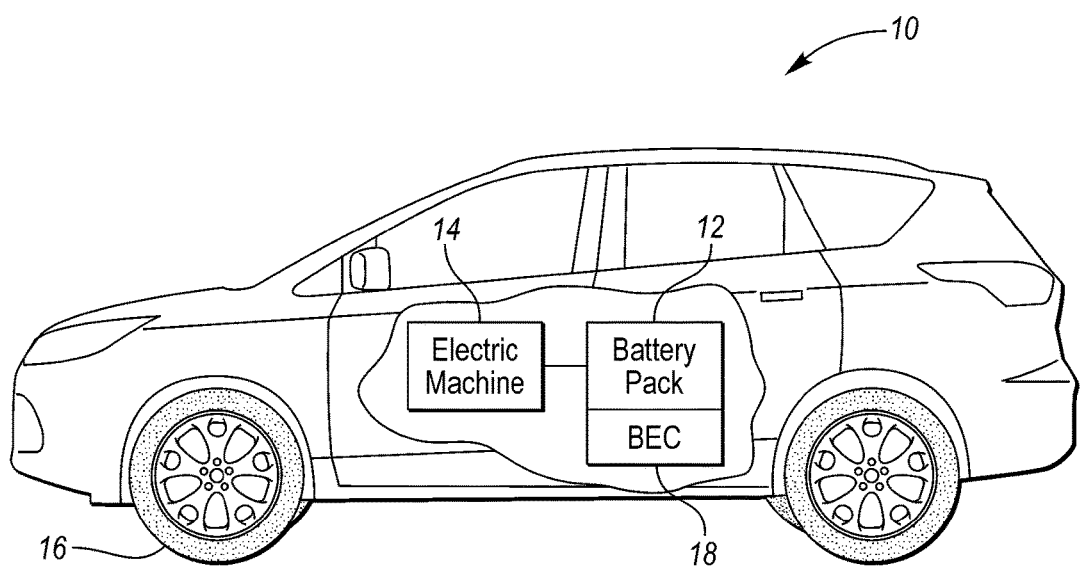
FIG. 1 is a schematic view of an exemplary electrified vehicle.

Referring to FIG. 1, an exemplary electrified vehicle 10 includes an energy system having a battery pack 12 to power an electric machine 14. The battery pack may be positioned at several different locations including below a front seat, a rear seat, or a location behind the rear seat of the vehicle. The vehicle 10 includes wheels 16 driven by the electric machine 14. The electric machine 14 receives electric power from the battery pack 12 and converts the electric power to torque. As discussed in greater detail elsewhere herein, one or more electrical components such as a bussed electrical center (BEC) 18 are disposed so as to be in communication with the battery pack 12.

The exemplary vehicle 10 is an all-electric vehicle, and the battery pack 12 may be recharged by an external power source (not shown). In other examples, vehicle 10 is a hybrid electric vehicle, which selectively drives the wheels 16 using an internal combustion engine (not shown) instead of, or in addition to, the electric machine 14. In hybrid electric examples, the electric machine 14 may selectively operate as a generator to recharge the battery pack 12.

Figure 2:
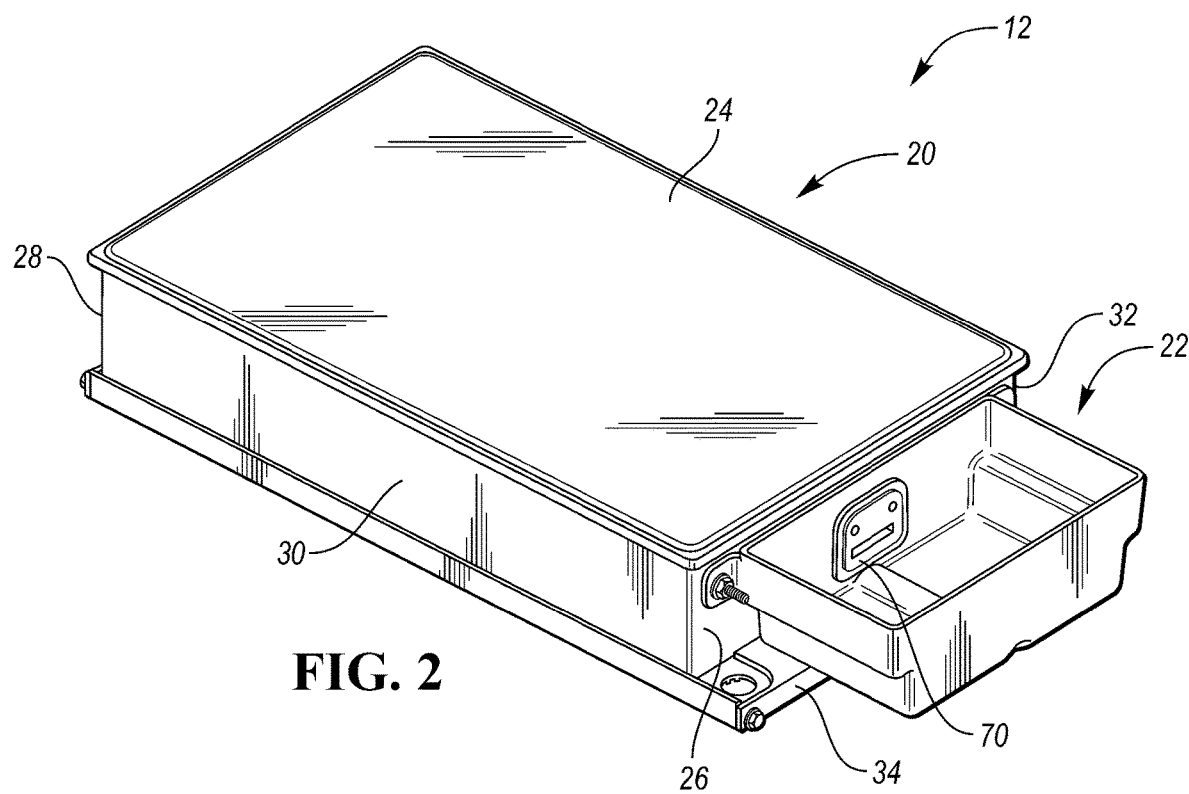
FIG. 2 is a perspective view of a battery pack.

Referring to FIG. 2, an illustrative battery pack 12 may include a battery module 20. The battery module 20 may also be referred to as a traction battery module. The battery module 20 includes a cover 24 and a bottom support wall 34. The battery module preferably includes a reinforcement structuring defined by a front reinforcement wall 26, a rear reinforcement wall 28, side reinforcement walls 30, 32. The front reinforcement wall 26 may include an aperture adapted to receive a connector interface 70, as described in greater detail elsewhere herein.

The battery pack 12 is in electrical communication with one or more electrical components disposed in a junction block module 22 (also referred to as a junction box). The junction block module 22 may be secured to, and removed from, the battery pack 12. For example, in approaches in which a reinforcement structure is used, the junction block module may be secured to the front reinforcement wall 26). In approaches in which a reinforcement structure is not used, the junction block module may be secured to an endplate of a peripheral frame (e.g., endplate 44 of peripheral frame 42 described in greater detail elsewhere herein).

The junction block module 22 preferably houses one or more electrical components such as BEC 18. The junction block module 22 may also, or instead, include various other components, such as one or more of a battery electrical control module (BECM), a DC/DC converter unit, a service disconnect, a fan, and contactors. The DC/DC converter unit may convert high voltage from the battery cells into low voltage for use by the components and systems. The BECM may act as a controller for the battery pack 12 and may also include an electronic monitoring system that manages temperature and charge state of each of the battery cells. The BECM may receive input signals from various control systems, process information included in the input signals, and generate appropriate control signals in response thereto. These control signals may activate and/or deactivate the various components. For example, the battery pack 12 may have a temperature sensor (not shown) such as a thermistor or other temperature gauge. The temperature sensor may be in communication with the BECM to provide temperature data regarding the battery pack 12. The temperature sensor may also be located on or near the battery cells within the battery pack 12. It is also contemplated that more than one temperature sensor may be used to monitor temperature of the battery cells.

Figure 3:
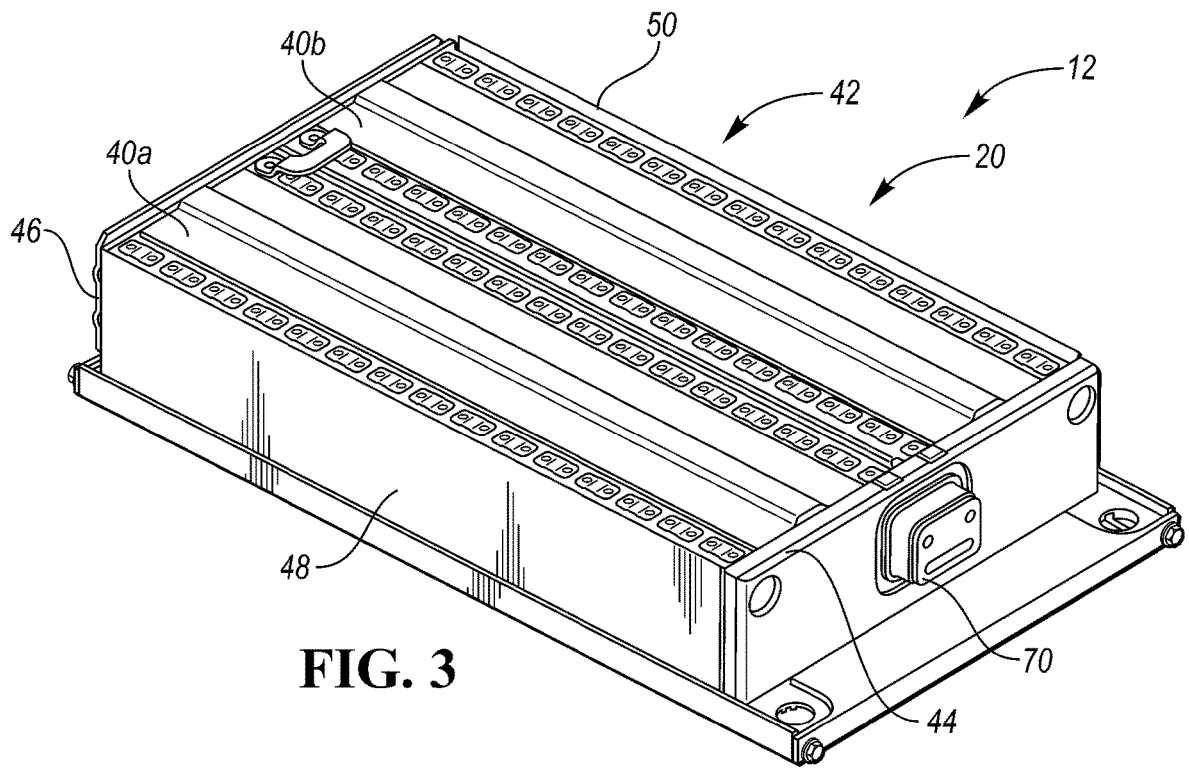
FIG. 3 is a perspective view of the battery pack of FIG. 2 with a battery pack cover and junction block cover removed.

Referring now to FIG. 3, the battery pack 12 includes battery cell arrays 40a and 40b (jointly referred to as "battery cell arrays 40"). The battery cell arrays 40 may also be referred to as cell stacks or first and second cell stacks. Each battery cell array may include individual battery cells. The battery cells, which may be prismatic cells, may include electrochemical cells that convert stored chemical energy to electrical energy. Prismatic cells may include a can housing, a positive electrode (cathode) and a negative electrode (anode). An electrolyte may allow ions to move between the anode and cathode during discharge, and then return during recharge. The battery cell arrays 40 may be in electrical communication with the BEC, BECM, DC/DC converter unit, and other vehicle components. For example, terminals may allow current to flow out of the cell for use by the vehicle components. When positioned in an array with multiple battery cells, the terminals of each battery cell may be aligned with opposing terminals (positive and negative) adjacent to one another to facilitate a series connection between the multiple battery cells.

Busbars may be used to assist in completing the series connection between adjacent battery cells or groups of battery cells proximate to one another. May cells or groups of batteries may also be connected in parallel. Different battery pack configurations may be available to address individual vehicle variables including packaging constraints and power requirements described further herein. The battery cells may be heated and/or cooled with a thermal management system. Examples of thermal management systems may include air cooling systems, liquid cooling systems and a combination of air and liquid systems.

A peripheral frame 42 supports and retains the battery cell arrays 40. The frame 42 may include integrally-formed or discrete peripheral components, such as front endplate 44, rear endplate 46, and side components 48, 50. The endplates 44, 46 may be configured to apply opposing longitudinal compression forces, or clamping loads, to the battery cell array 40. In this way, the front endplate 44, the battery cell array 40, and the rear endplate 46 define a compressive load path.

The side components 48, 50 may similarly be configured to apply opposing lateral compression forces, or clamping loads, to the battery cell arrays 40. The front endplate 44 may be secured to the peripheral frame 42 through any suitable approach. For example, the front endplate 44 may be secured at ends of side components 48, 50 through fasteners. In one approach, the front endplate 44 may be removably secured to the peripheral frame 42. In another approach, the front endplate 44 may be permanently secured to the peripheral frame 42. Other approaches for securing the front endplate 44 in place are expressly contemplated.

Figure 4:
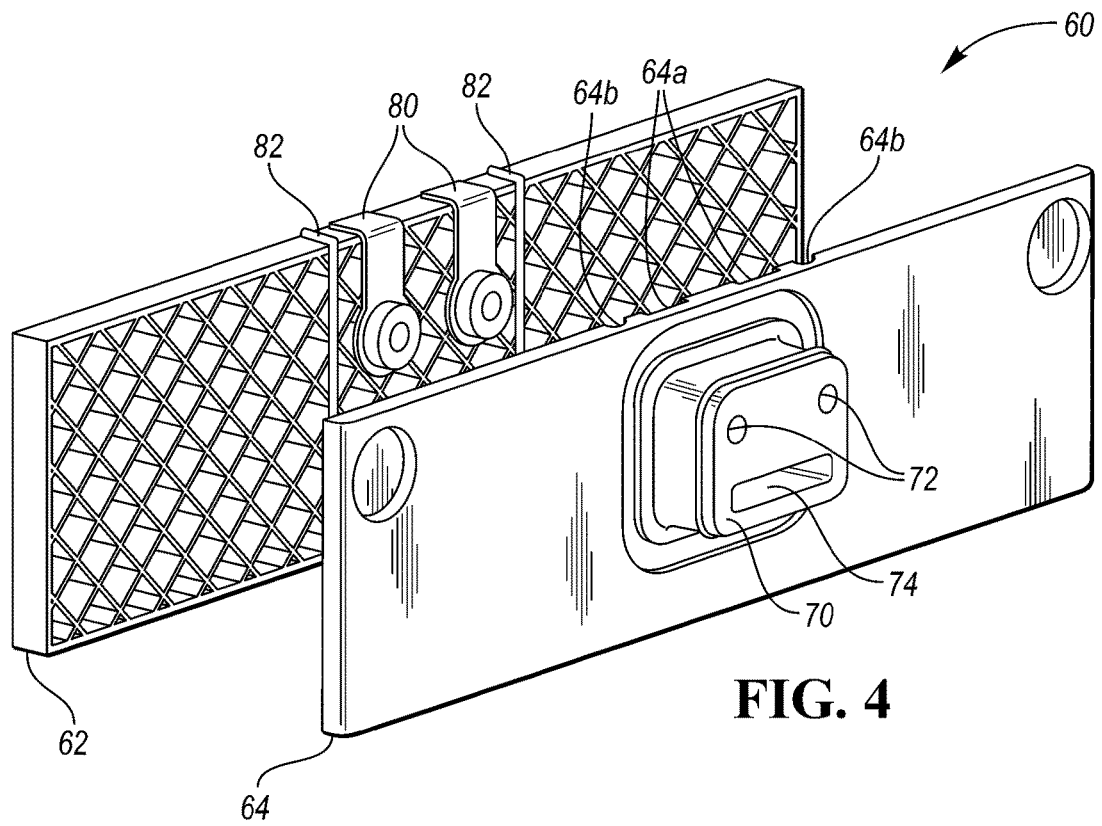
FIG. 4 is an exploded view of an integrated endplate.

Referring now to FIG. 4, the front endplate is preferably an integrated endplate 60. The integrated endplate 60 may be a multi-piece component having an inner wall 62 and an outer wall 64. In the configured form, the inner wall 62 is preferably disposed adjacent to a battery of the battery cell array 40 such that the integrated endplate 60, the battery cell array 40, and an opposing endplate (e.g., endplate 46) define a compressive load path. It is therefore preferable that one or both of the inner wall 62 and outer wall 64 are formed of an insulative material such as plastic. In this way, the inner wall 62 and outer wall 64 may be combined to form a plastic endplate for applying a longitudinal compression force, and a plastic housing for connector components, as described in greater detail elsewhere herein. The inner wall 62 may be secured to the outer wall 64 using any suitable approach, such as a snap-fit interference fit or mechanical fasteners.

The outer wall 64 includes a connector interface 70 that may include, for example, a high voltage interface 72 and a low voltage interface 74. The high and low voltage interfaces 72, 74 are preferably defined, at least in part, by apertures extending through the connector interface 70. The connector interface 70 preferably protrudes from a surface of the outer wall 64 of the integrated endplate 60 such that the connector interface 70 may engage junction block module 22, as shown in FIG. 2. In one approach, the connector interface 70 is integrally formed with the outer wall 64. In another approach (not shown), the interface is a discrete component disposed within and extending through an aperture of the outer wall 64. In still another approach (not shown), the connector interface is a recessed interface disposed in a recess of the outer wall.

One or more high voltage connectors 80 may be disposed between the inner wall 62 and the outer wall 64 and extend to the connector interface 70 of the outer wall 64. The high voltage connectors 80 are in communication with the high voltage interface 72 of the connector interface 70. For example, the high voltage connectors 80 may extend into the apertures defining the high voltage interface 72 of the connector interface 70. The high voltage connectors 80 are disposed so as to transfer electric current from the battery cell arrays 40 (for example, through interconnector busbars) through the high voltage interface 72 of the connector interface 70 to one or more electrical components disposed in the junction block module 22 (e.g., BEC 18). The high voltage connectors 80 are preferably sockets for a socket and pin-style electrical contact system, and are preferably suitable for applications of 30 amps and above.

One or more low voltage connectors 82 may be disposed between the inner wall 62 and the outer wall 64 and extend to the connector interface 70 of the outer wall 64. The low voltage connectors 82 are in communication with the low voltage interface 74 of the connector interface 70. For example, the low voltage connectors 82 may extend into the apertures defining the low voltage interface 74 of the connector interface 70. The low voltage connectors 82 are disposed so as to transfer electric current between a an electrical component (e.g., BEC 18) or other battery or vehicle system controller to the battery cell arrays 40 through the low voltage interface 74 of the connector interface 70. In this way, components such as circuit boards and/or controllers directly connected to the battery cell arrays 40 may be provided with low voltage power. Contactors that electrically connect and disconnect the battery pack 12 from the vehicle 10 may also be powered through the low voltage interface 74 of the connector interface 70. The low voltage connectors 82 may be, for example, blade receptacles for receiving conductive blades.

The high voltage connectors 80 and/or the low voltage connectors 82 preferably extend along a top surface of the inner wall 62 and down an interior surface of the inner wall 62. The outer wall 64 may include one or more notches (e.g., notches 64a) for receiving the high voltage connectors 80 and/or one or more notches (e.g., notches 64b) for receiving the low voltage connectors 82. In this way, an interior surface of the outer wall 64 may sit flush against an interior surface of the inner wall 62. In other approaches (not shown), the inner wall 62 may similarly be provided with accommodating notches.

Integration of the high voltage connectors 80 with the high voltage interface 72 of the connector interface 70, and/or the low voltage connectors 82 with the low voltage interface 74 allows the battery module 20 to be sufficiently sealed in final configuration (for example, by cover 24 and corresponding fasteners). In this way, maintenance on various components of the battery pack 12 may be performed without the need for a user to access the interior of the battery module 20 housing the battery cell arrays 40. As such, the frequency of end user interaction with the battery cell arrays 40 may be reduced.

The integrated endplate 60 also provides a simplified connection and disconnection of the battery module 20, through the connector interface 70, with the components provided in the junction block module 22. Initial manufacture and installation time and costs may therefore be reduced. Furthermore, subsequent maintenance time and costs may also be reduced as service technicians may quickly connect and disconnect the battery module 20 from the junction block module 22 in performing maintenance on the battery pack 12.

Furthermore, by integrating the high voltage connectors 80 with the high voltage interface 72 of the connector interface 70, and the low voltage connectors 82 with the low voltage interface 74, the vertical height and horizontal footprint of the battery module 20 may be reduced. For example, the need for separate connector cables and connector modules (as provided in known battery systems) are not required to connect the battery cell arrays 40 to battery control modules.

Furthermore, in approaches described herein in which one or both of the inner wall 62 and the outer wall 64 of the integrated endplate 60 are comprised of a plastic, the integrated endplate 60 may provide improved thermal integrity of individual cells of the battery cell arrays 40. For example, the plastic materials of the integrated endplate 60 have a lower heat transfer coefficient as compared to known endplates formed of thermally-conductive metals. In this way, temperature drop of the battery cell or cells immediately adjacent the inner wall 62 may be reduced so as to improve overall battery performance.

In another approach (not shown), the integrated endplate may be a one-piece component. The integrated endplate may include a high voltage interface and/or a low voltage interface. In this approach, high voltage connectors and/or low voltage connectors may be inserted into integrated endplate to communicate with corresponding voltage interfaces.

In still another approach (not shown), the battery pack may be provided with multiple integrated plates. In one example, both opposing endplates may be integrated endplates. In another example, one or more side components and one or more endplates may be integrated plates. In this way, the battery pack may be provided with multiple plates to provide the benefits described herein.

Figure 5:
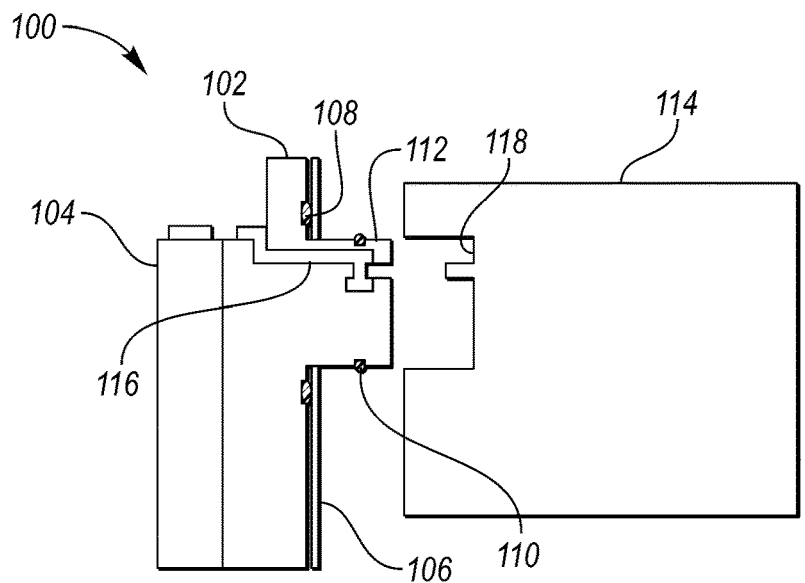
FIG. 5 is a schematic view of a first exemplary battery pack.
Figure 6:
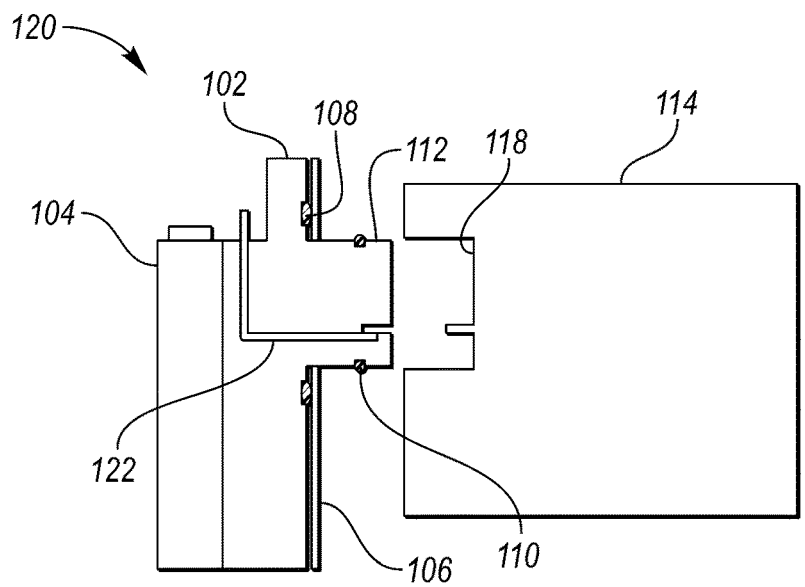
FIG. 6 is a schematic view of a second exemplary battery pack.
Figure 7:
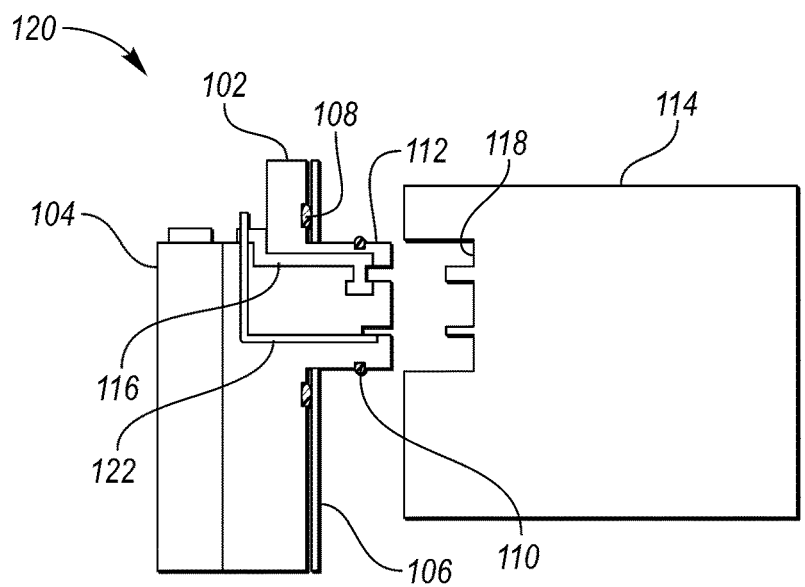
FIG. 7 is a schematic view of a third exemplary battery pack.

With reference to FIGS. 5-7, various combinations of high voltage connectors and low voltage connectors may be incorporated in the battery pack to extend through the connector interface of the integrated connector.

Referring to FIG. 5, a first exemplary battery pack 100 includes an integrated endplate 102 disposed between an adjacent battery cell 104 of a battery cell array and a front reinforcement wall 106. The battery pack 100 includes a first seal 108 between the integrated endplate 102 and the front reinforcement wall 106. The battery pack 100 also includes a second seal 110 between a connector interface 112 of the integrated endplate 102 and an electrical component 114 (such as, for example, BEC 18). In this approach, a high voltage connector 116 extends through the integrated endplate 102 to electrically couple the battery cell array to the electrical component 114 at a connector interface 118 of the electrical component 114. The high voltage connector 116 may include a socket contact for receiving a conductive pin.

Referring to FIG. 6, a second exemplary battery pack 120 includes an integrated endplate 102 disposed between an adjacent battery cell 104 of a battery cell array and a front reinforcement wall 106. The battery pack 100 includes a first seal 108 between the integrated endplate 102 and the front reinforcement wall 106. The battery pack 100 also includes a second seal 110 between a connector interface 112 of the integrated endplate 102 and an electrical component 114 (such as, for example, BEC 18). In this approach, a low voltage connector 122 extends through the integrated endplate 102 to electrically couple the battery cell array to the electrical component 114 at a connector interface 118 of the electrical component 114. The low voltage connector 122 may include a receptacle for receiving a conductive blade.

Referring to FIG. 7, a third exemplary battery pack 130 includes an integrated endplate 102 disposed between an adjacent battery cell 104 of a battery cell array and a front reinforcement wall 106. The battery pack 100 includes a first seal 108 between the integrated endplate 102 and the front reinforcement wall 106. The battery pack 100 also includes a second seal 110 between a connector interface 112 of the integrated endplate 102 and an electrical component 114 (such as, for example, BEC 18). In this approach, both a high voltage connector 116 and a low voltage connector 122 extend through the integrated endplate 102 to electrically couple the battery cell array to the electrical component 114 at a connector interface 118 of the electrical component 114.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrified vehicle comprising:
   an electric machine;
   a bussed electrical center electrically connected to the electric machine; and
   a battery pack electrically connected to the bussed electrical center, the battery pack including
   a battery cell array, and
   a frame for supporting the battery cell array, the frame including opposing side components and opposing endplates, wherein at least one opposing endplate is an integrated endplate having
      an inner wall disposed adjacent to the battery cell array,
      an outer wall having a first side adjacent to the inner wall and a second side opposite the first side, the outer wall including a connector interface protruding from the second side and defining a high voltage aperture and a low voltage aperture therethrough,
      a high voltage connector extending between the inner wall and the outer wall to the high voltage aperture of the connector interface for transferring electric current from the battery cell array to the bussed electrical center, and
      a low voltage connector extending between the inner wall and the outer wall to the low voltage aperture of the connector interface for transferring electric current from the bussed electrical center to an electrical component connected to the battery cell array.

2. The electrified vehicle of claim 1, wherein the connector interface is a first connector interface, and wherein the bussed electrical center includes a second connector interface having a recess adapted to receive the first connector interface of the integrated endplate.

3. An integrated endplate for a battery pack, comprising:
   an inner wall;
   an outer wall having a first side adjacent to the inner wall and a second side opposite the first side, the outer wall including a connector interface protruding from the second side and defining a high voltage aperture and a low voltage aperture therethrough;
   a high voltage connector extending between the inner wall and the outer wall to the high voltage aperture of the connector interface; and
   a low voltage connector extending between the inner wall and the outer wall to the low voltage aperture of the connector interface,
   wherein the low voltage connector transfers electric current from a bussed electrical center disposed adjacent to the outer wall to an electrical component connected to a battery cell array disposed adjacent to the inner wall.

4. The integrated endplate of claim 3, wherein at least one of the high and low voltage connectors extends from a top region of the inner wall along a first side of the inner wall, and wherein the first side of the inner wall is adjacent the first side of the outer wall.

5. The integrated endplate of claim 4, wherein the outer wall is secured to the inner wall to enclose at least a portion of the at least one of the high and low voltage connectors between the first side of the inner wall and the first side of the outer wall.

6. The integrated endplate of claim 3, wherein the outer wall includes at least one notch in the first side, and wherein the notch is adapted to receive the high voltage or low voltage connector.

7. The integrated endplate of claim 3, wherein the high voltage connector transfers electric current from a battery cell array disposed adjacent to the inner wall to a bussed electrical center disposed adjacent to the outer wall.

8. The integrated endplate of claim 7, wherein the high voltage connector includes a socket contact for receiving a conductive pin.

9. The integrated endplate of claim 3, wherein the low voltage connector includes a receptacle for receiving a conductive blade.

* * * * *